United States Patent
Cook et al.

(10) Patent No.: US 7,794,582 B1
(45) Date of Patent: Sep. 14, 2010

(54) METHOD OF RECOVERING METAL IONS RECYCLABLE AS SOLUBLE ANODE FROM WASTE PLATING SOLUTIONS

(75) Inventors: Paul E Cook, Grosse Pointe, MI (US); Jeries I Bishara, Mentor, OH (US)

(73) Assignee: EW Metals LLC, Grosse Pointe, MI (US)

(*) Notice: Subject to any disclaimer, the term of this patent is extended or adjusted under 35 U.S.C. 154(b) by 1091 days.

(21) Appl. No.: 10/817,655

(22) Filed: Apr. 2, 2004

(51) Int. Cl.
C02F 1/46 (2006.01)

(52) U.S. Cl. ............... 205/702; 205/742; 205/758; 205/771; 205/772; 205/100

(58) Field of Classification Search ............ 205/702, 205/742, 758, 771, 772, 100
See application file for complete search history.

(56) References Cited

U.S. PATENT DOCUMENTS

| | | | |
|---|---|---|---|
| 2,248,718 A | 7/1941 | Owen | |
| 3,069,345 A | 12/1962 | Lowdermilk et al. | |
| 3,141,837 A | 7/1964 | Edelman | |
| 3,331,763 A | 7/1967 | Mabey | |
| 3,431,187 A | 3/1969 | Lancy | |
| 3,650,925 A * | 3/1972 | Carlson | 205/562 |
| 3,804,733 A | 4/1974 | Bennion et al. | |
| 3,953,313 A | 4/1976 | Levenson | |
| 4,034,422 A | 7/1977 | Farber et al. | |
| 4,039,422 A | 8/1977 | Packer | |
| 4,097,347 A | 6/1978 | Packer | |
| 4,139,432 A | 2/1979 | Ghiringhelli et al. | |
| 4,157,424 A | 6/1979 | Boutle | |
| 4,171,255 A | 10/1979 | Tuznik et al. | |
| 4,276,147 A | 6/1981 | Epner et al. | |
| 4,312,716 A | 1/1982 | Maschler et al. | |
| 4,326,938 A | 4/1982 | Das Gupta et al. | |
| 4,336,124 A | 6/1982 | Gerard et al. | |
| 4,399,020 A | 8/1983 | Branchick et al. | |
| 4,436,601 A | 3/1984 | Branchick et al. | |
| 4,445,990 A * | 5/1984 | Kim et al. | 588/303 |
| 4,515,672 A | 5/1985 | Platek et al. | |

(Continued)

OTHER PUBLICATIONS

SCPS website pages re: New Metallic Foams printed Feb. 19, 2004.

(Continued)

*Primary Examiner*—Arun S Phasge
(74) *Attorney, Agent, or Firm*—Reising Ethington P.C.

(57) ABSTRACT

Disclosed is a method of recovering metal from waste plating stream and using the recovered metal comprising: providing a waste metal plating stream containing metal ions in an aqueous solution; passing the waste metal plating stream containing the metal ions into an electrochemical cell assembly having an inlet for the waste metal plating stream, a plurality of alternating anodes and cathodes porous to the waste metal solution and an exit from the cell; passing the waste metal plating stream through pores of the cathode; passing an electrical current through the anodes and cathodes, thereby depositing a portion of the metal ions onto the cathodes and reducing the amount of the metal ion in the solution from that in the introduced waste metal plating stream; recovering the deposited metal from the cathode; and using the recovered deposited metal as a source of soluble metallic anode to be deposited on to a substrate in a subsequent metal plating process.

11 Claims, 2 Drawing Sheets

U.S. PATENT DOCUMENTS

| | | | |
|---|---|---|---|
| 4,585,539 A | | 4/1986 | Edson |
| 4,834,850 A | | 5/1989 | de Nora et al. |
| 4,911,804 A | * | 3/1990 | Dickson .................... 205/575 |
| 5,006,216 A | | 4/1991 | Dietrich et al. |
| 5,032,245 A | | 7/1991 | Gemelli et al. |
| 5,246,559 A | | 9/1993 | Bishara et al. |
| 5,405,507 A | | 4/1995 | Bishara et al. |
| 5,474,661 A | | 12/1995 | Bishara et al. |
| 5,573,652 A | * | 11/1996 | Kiyama et al. ................ 205/98 |
| 5,593,627 A | | 1/1997 | Bishara et al. |
| 5,827,411 A | | 10/1998 | Bishara et al. |
| 6,051,191 A | | 4/2000 | Ireland |
| 6,235,665 B1 | | 5/2001 | Pickrell et al. |
| 6,592,787 B2 | | 7/2003 | Pickrell et al. |

OTHER PUBLICATIONS

Technical Brochure of Eltech Systems Corporation regarding electrochemistry published before filing date of Apr. 2, 2004.

Novel Lightweight Metal Foam Heat Exchangers, David P. Haack, Kenneth R. Butcher, T. Kim and T.J. Lu, printed from Porvair website on Feb. 19, 2004.

Incofoam for Batteries, Catalysis and Filter publication 1999.

Porvair White Papers re:fuel cells printed Feb. 13, 2004 from Porvair website.

A New Generation of Ceramic Foams with Small Pore Size by Kenneth R. Butcher and Gary R. Pickerell of Porvair Advanced Materials, printed from Porvair website on Feb. 19, 2004.

Thermal Transport Phenomena in Porvair Metal Foams and Sintered Beds, C.Y. Zhao, T. Kim, T. J. Lu and H.P. Hodson dated Aug. 2001.

Bewt Metal REcovery Technology quotation Mar. 6, 2000.

* cited by examiner

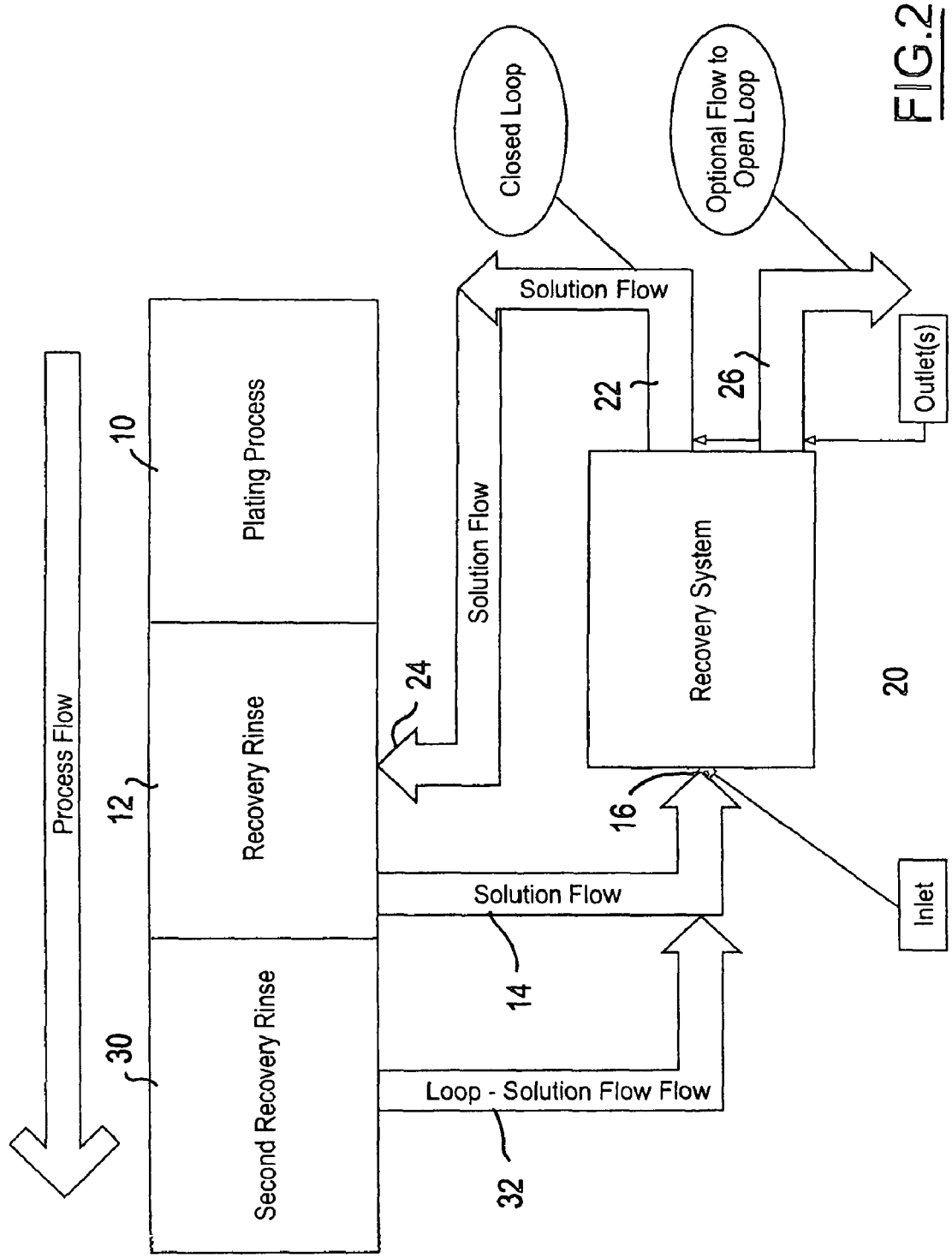

METHOD OF RECOVERING METAL IONS RECYCLABLE AS SOLUBLE ANODE FROM WASTE PLATING SOLUTIONS

TECHNICAL FIELD OF THE INVENTION

The present invention is concerned with a recovering of metal ions from waste metal plating streams and minimize waste treatment, reduce plating cost and water usage.

BACKGROUND OF THE INVENTION

Metal plating has been known for many years and is a technique for the application of a thin metallic coating to a substrate. While the use of electroless deposition of metals may be utilized, generally electroplating is the more frequent technique where there is a generation of waste metal ion containing streams. As a portion of the deposition process, metals ions remain in solution which may not deposit onto a substrate. These ions nevertheless are present in the solution and need to be treated so that the resulting solution is environmentally safe and can be subsequently disposed. The coatings of metals by electro-deposition and other processes is substantially described as well known in the field. See *Metals Handbook* 9th Edition Volume 5, published by the American Society of Metals, 1982. Recovery of metal ions from waste metal plating streams using an electrolytic technique has been described in U.S. Pat. Nos. 4,436,601 and 4,515,672, which are hereby incorporated by reference.

The prior art describes cathodes used in metal ion recovery which may generate impurities in their use such as cathodes based on an organic substance in manufacture which when introduced into plating streams is undesirable.

The prior art likewise is lacking in a disclosure for a convenient mechanism for being able to economically operate recovery of metal values in a waste stream and to reuse those recovered metal values.

SUMMARY OF THE INVENTION

The invention pertains to a method of recovering metal from waste plating streams and using the recovered metal comprising: providing a waste metal plating stream containing metal ions in an aqueous solution; passing the waste metal plating stream containing the metal ions into an electrochemical cell assembly having an inlet for the waste metal plating stream, a plurality of alternating anodes and cathodes porous to the waste metal solution and an exit from the cell; passing the waste metal plating stream through pores of the cathode; passing an electrical current through the anodes and cathodes, thereby depositing a portion of the metal ions onto the cathodes and reducing the amount of the metal ion in the solution from that in the introduced waste metal plating stream; recovering the deposited metal from the cathode; and using the recovered deposited metal as a source of metal to be deposited on to a substrate in a subsequent metal plating process.

Another feature of the invention is the utilization of porous cathodes that are comprised of sintered metal material such as in a pure state.

Another aspect of the invention is the utilization of a continuous process for removal of metal ions from a waste plating stream by depositing the metal ions onto porous cathodes in an electrochemical cell, whereby the waste stream is obtained from an aqueous rinse bath formed as a result of water washing a plated metal part after a deposition of the metal plate onto a substrate.

BRIEF DESCRIPTION OF THE DRAWINGS

FIG. 2 is a flow diagram depicting the process of the present invention.

DETAILED DESCRIPTION OF THE INVENTION

Figure 1:
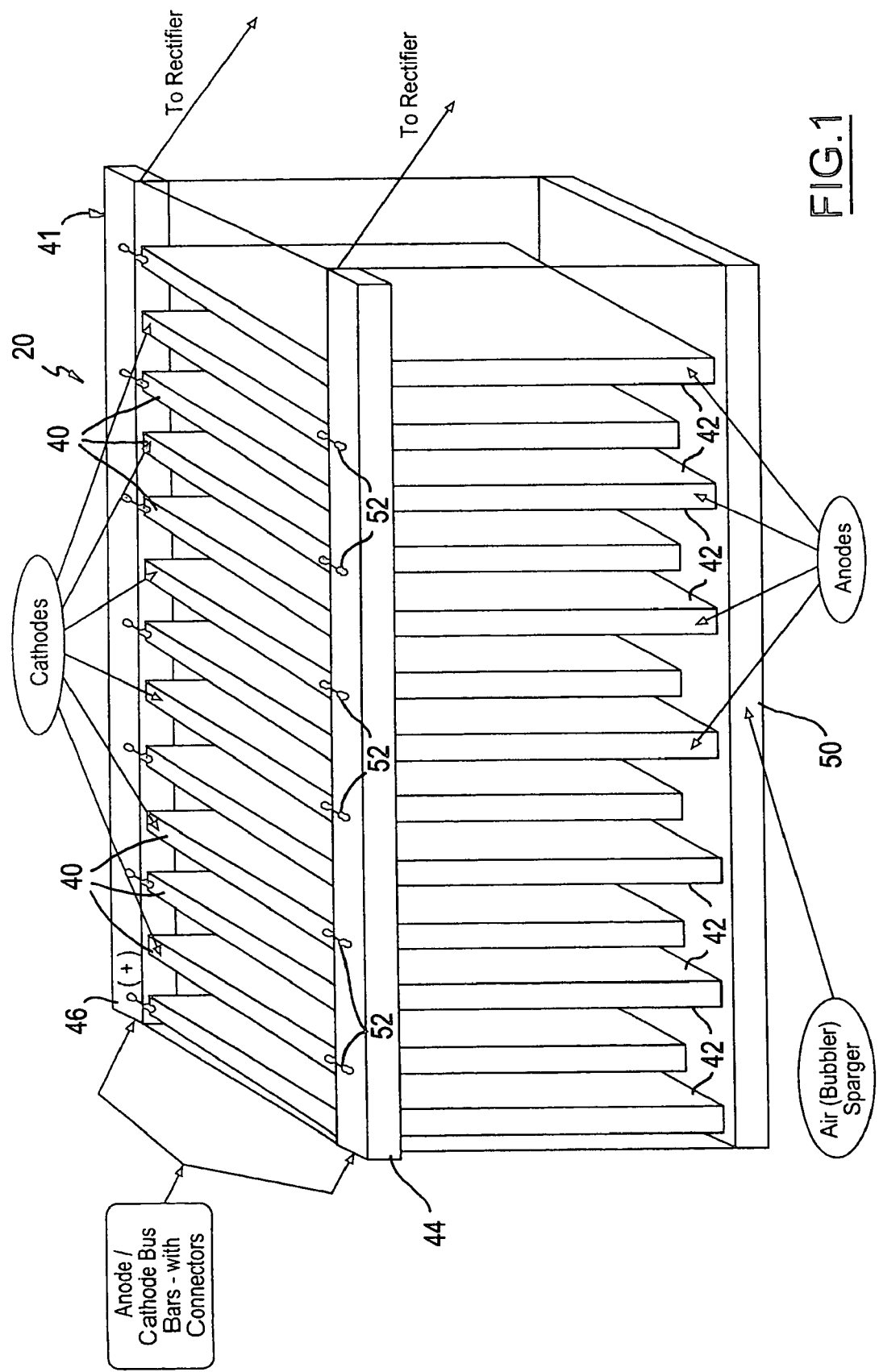
FIG. 1 is a schematic drawing of the electrochemical cell assembly of the present invention.

The invention pertains to a method of recovering metal from waste plating streams and using the recovered metal. The process can generally be described by making reference to the flow diagram as shown in FIG. 2. In a plating process 10, generally there is a deposition of metal onto a substrate. The deposition process can be an electroless or an electro deposition. By electroless is meant that there is no use of electricity to assist in the deposition of the metal onto a substrate. In an electro deposition process, generally there is a metal electrode such as an soluble anode which is the source of metal ions that go into solution and are deposited from the solution onto a substrate, generally metallic substrate or a nonmetallic substrate that has been activated to accept a metal plating thereon. Electroless and electro deposition processes are well known to one of skill in the field. Numerous metals can be deposited onto desirable substrates where the depositable metals may be cadmium, chromium, cobalt, copper, lead, nickel, zinc and mixtures thereof, precious metals such as palladium, platinum and mixtures thereof, and the like. See table 1 below which has a description of some of the types of metals, the electrolyte that may be utilized and some of the operating conditions or results occurring by virtue of an electro deposition.

TABLE 1

| METAL | ELECTROLYTE | COMMENTS |
| --- | --- | --- |
| Cadmium | Acid | Cadmium can be recovered but pH control may be required |
| Cadmium | Cyanide | Cyanide destruction also takes place |
| Cobalt | | pH above 4 |
| Copper | Acid sulfate | Concentrated and dilute solutions |
| Copper | Electroless | Same as acid sulfate |
| Copper | Spent etch | After residual oxidizers have been destroyed |
| Nickel | Acid | pH control 3.8-4.2 |
| Nickel | Electroless | Rinses can be recovered such as with pH adjustment |
| Palladium | | Can be recovered such as with pH adjustment |
| Zinc | Alkaline | Efficient to low ppm levels pH adjustment (Ph 10-14) |
| Zinc | Cyanide | Cyanide destruction also takes place (pH 10-14) |
| Zinc | Sulfate | Most efficiently recovered with high current density system. (pH 4-5) |

After the substrate has had a metal plated thereon, the substrate will be removed from the plating process and moves to a rinse area 12. In the recovery rinse area 12, water is applied to the substrate to wash off any undesirable materials that may be left on the electrodeposited substrate. A water bath generally is present at the bottom of the washing chamber 12. The aqueous solution from the washing area 12 is flowed in a conduit 14 to an inlet 16 of the electrolytic cell recovery system 20. The details of the electrolytic recovery system 20 are shown in FIG. 1.

Continuing with the description of the overall process, aqueous fluid from the recovery system 20 exits through conduit 22 and can be directed back to the rinse recovery chamber 20 through line 24. This in essence results in a closed loop system which would facilitate the flow of solution from the rinse recovery area 12 to the metal ion recovery system 20 and then back to the rinse recovery 12 through conduits 22 and 24.

Optionally, the output from the recovery system can be sent for subsequent processing or treatment prior to introduction into an environmentally designated area through conduit 26.

Optionally and alternatively, there can be a second recovery rinse occurring in chamber 30. In that rinse area there could be an additional rinsing of the deposited substrate which aqueous fluid would flow through conduit 32 into the inlet 16 of the recovery system 20. FIG. 2 indicates that the solution present in conduit 32 is blended with the solution in conduit 14. It is to be appreciated that there could be independent introductions into one inlet or multiple inlets in the recovery system 20.

The recovery system 20 is shown in detail in FIG. 1 wherein there are alternating cathodes 40 and anodes 42 present in the electrolytic cell assembly. The cell assembly 41 is comprised of the cathodes 40 and anodes 42 each of which are connected to the appropriate anode bus 44 or cathode bus 46. The cathodes are directly connected to the bus by arms 48', anodes are likewise connected to the bus by arms 52 to facilitate electrical connections. The anode and cathode busses are in turn connected to a rectifier (not shown). At the bottom of the electrolytic cell there is an air sparger 50 which bubbles air into the electrochemical cell assembly 20 to assist in the deposition of the metal ions onto the cathode. The recovery process can be described as follows:

Electro Recovery of Metals Via Electroplating Process

Cathodic reaction is a reduction process

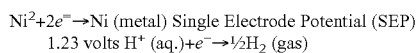
$Ni^{2+}+2e^- \rightarrow Ni$ (metal) Single Electrode Potential (SEP) 1.23 volts $H^+$ (aq.)$+e^- \rightarrow \frac{1}{2}H_2$ (gas)

Anodic reaction is an oxidation process

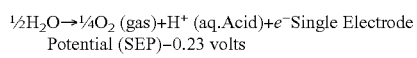
$\frac{1}{2}H_2O \rightarrow \frac{1}{4}O_2$ (gas)$+H^+$ (aq.Acid)$+e^-$ Single Electrode Potential (SEP)−0.23 volts The various parts of the cell are described below.

Components of the Cell

FIG. 1 illustrates the various parts of the cell.

1. Cell Body—Cell body can be comprised of any plastic such as polypropylene, polyethylene, polyvinyl chloride (PVC), polycarbonate, poly(meth)acrylic, and the like. The plastic cell contains a series of grooves located on the internal walls of the cell which maintain the electrodes in a fixed vertical position.

2. Current Conductors—The conductors consist of two copper bars whose size is determined by the maximum cell current.

3. Flow Distributor—A sheet of perforated PVC material measuring approximately 0.25" in thickness is located at the inlet end of the cell. It allows for the dispersion of the electrolyte in uniform flow through the cell. An identical sheet is situated at the outlet end of the cell.

4. Cover—(Optional) The cell is equipped with a cover to prevent foreign objects from entering the cell while allowing the gaseous products, which are evolved during cell operation to freely escape.

5. Anodes—The DSA (dimensionally stabled anodes) are porous and are made of expanded metals, such as titanium mesh with a rare earth oxide coating. The titanium assures good corrosion resistance and reliable contact to the anode bus bar. These are commercially available anodes from Eltech Systems Corp.

6. Anode-Cathode Isolator—A spacer of molded plastic is placed on the anode to avoid short-circuiting between the anode and the cathode while maintaining a uniform distribution of current over the entire surface of the electrode.

7. Cathode—High surface porous area metallic cathodes are available such as copper or nickel preferably comprised of sintered metal. The electrolyte to be treated flows through a series of cathodes (and anodes) before exiting the cell. The cathodes measure approximately 15 in.×18 in.×0.25 in. and maybe made from powdered metal that is sintered to form the cathodes. Expanded and/or micro-mesh cathodes of copper or nickel are also commercially available for varied applications. The cathodes can be obtained from a variety of commercial sources such as Porvair Fuel Cell Technology Inc. of Hendersonville, N.C. (see U.S. Pat. No. 6,706,239, herein incorporated by reference), including Porvair's metal foam metallic material or Inco of Toronto, Ontario Canada including its product entitled INCO Foam, and the like.

8. Cathode Circuit Beakers—(optional) Each cathode may be protected from electrical overload by a 20 ampere circuit breakers.

9. Air Sparger—This is a perforated double tube located at the bottom of the cell. The air bubbles improve electrolyte agitation and dilute the gases produced at the electrodes.

10. Eductors—(optional) A series of high solution flow eductors connected to a pump utilized for applications utilizing increased flow rates.

11. Rectifier—(optional) 100, 300, 500, 750 or 1,000 A (amperes) and 8-10 volts depending on the type of cell.

12. Liquid Level Control (LLC)—(optional) A liquid level control device may be installed in the cell to detect low solution levels and turn off the rectifier should this occur. The LLC and a heat sensor control are connected to the rectifier to insure that the temperature of the liquid in the cell assembly is kept within a desired temperature, such as less than 140° F. (60° C.).

13. Flowmeter—0-10 gal./min. through the cell assembly 20.

14. Pump—(optional) magnetic drive (up to 10 gal./min.).

15. Filter—In line polypropylene and carbon cartridge type filter utilized for removal of solids and organic matter prior to entering cell.

The current density of the electrolytic cell assembly can vary widely but generally is from 4 to 6 A/ft² (amps per square foot).

In reviewing FIG. 1 it is to be appreciated that the electrochemical cell for removal of the metal ions via electro deposition from the waste metal stream solution does not utilize a permeable diaphragm or a cationic or anionic membrane or separator. It is to be appreciated however that such diaphragm or membranes can be utilized as desired. Such diaphragms are well known in the art such as that marketed by Eltech Systems called Elramix or permeable ceramic diaphragms manufactured by Ferro Corp. and Teflon cation or anion non-permeable membranes manufactured by DuPont.

In the electrolytic cell 20 of the present invention, the pH of the solution will vary depending upon the waste metal stream that is generated during the deposition process or the metal plating of chamber 10.

The porous cathodes are generally comprised of sintered metal such as nickel having a porosity of 5 to 100 pores per inch (ppi) or about 5 to 25 ppi. A pore generally means one having an aperture of 3.0-0.2 mm in diameter, respectively, when compared to the range of ppi (5-100 ppi).

In general, the waste plating solution can have a metal ion content of a range of 0.5 to 500 grams per liter coming from the rinse recovery area chamber 12. It is to be appreciated that the concentration of metal ions will decrease in the recovery system 12 and then the solution goes back to the recovery rinse area 12. Since this is a continuous process, a substantial amount of metal may be removed from the system during the recovery phase as shown in chamber 20. However, it has been found that using a commercial nickel electroplating technique and using sintered metal cathodes in the electrochemical cell 20, a cathode 40 had a beginning weight of approximate 510 grams and after one week of operation, the cathode 40 weighed about 2100 grams resulting in 1600 grams per cathode being removed from the treated solution.

A single pass recovery can be obtained at a range of 30 to 90 percent depending on flow rate, metal ion concentration and current density. A preferred range is between 35 and 70 percent for a nickel ion containing waste solution. The electrodeposition current density is increased when high metal ion concentration is utilized. For a single pass system the current efficiency will decrease when metal ion concentration is dropped and the recovery efficiency may drop from 200 to 100 grams per liter.

A particularly important aspect of the present invention is to utilize the cathodes after the metal has been deposited thereon in the electrochemical cell assembly 20 by breaking up or fracturing the metal deposit. The metal deposit is cut into pieces (1'-2"×1"-2") and can then be inserted into the deposition chamber 10 and can be the source of metal as an anode in the plating process. It is to be appreciated that the metal deposited may be fractured or broken up in any fashion into a smaller, more useful size as a portion of the soluble anode in the plating process. The metal deposit can be cut, sheared, pelletized and the like. In a typical nickel electrodeposition process, nickel is plated onto a metallic substrate and the nickel coated metallic substrate is then rinsed after the electro deposition process. The aqueous rinse solution is then passed to the metal recovery cell assembly chamber 20 with the nickel ions from the waste solution being removed from the solution and deposited onto the sintered porous cathodes. The nickel deposited onto the cathodes is then subsequently removed, fractured and utilized as a source of metal and becomes a portion of the soluble anode during the normal metal deposition technique in plating processes that would occur in chamber 10.

It is to be appreciated that the recovery process of the present invention is applicable to a batch recovery, a drag out recovery or a closed loop recovery.

By batch recovery is meant that the waste that is to be treated is a solution of metal ions that may have been rejected or decanted containing the metal ions such as the nickel plating solution. In the batch technique, the nickel plating solution recovered plating efficiency starts at 100% or 1 gram per amp hour (Ahr) and drops when the concentration is below 2 grams per liter.

In the drag out system, the purpose is to recover the metal values such as from the rinse system. The metal values may have a concentration of 5 decreasing down to 1 gallon per minute with a plating current efficiency ranging from 100 to 60 percent, respectively, without a single pass evaluation. When the concentrations drops below 200 parts per million then there can be a single pass recovery which should be evaluated to allow one to cease using subsequent rinses.

In a closed loop rinse system, there is a cascaded rinse system where the sintered cathodes should be used in order to achieve the lowest possible metal ion concentration. Here, a single pass recovery system should be evaluated on a two hour basis.

While the form of the invention herein disclosed constitutes presently preferred embodiments, many others are possible. It is not intended herein to mention all of the possible equivalent forms or ramifications of the invention. It is understood that the terms used herein are merely descriptive rather than limiting and that the various changes may be made without departing from the spirit or scope of the invention. It is to be appreciated that the number of anodes and/or cathodes in the electrolytic recovery chamber can vary substantially as well as multiple such electro chemical deposition chambers can be utilized.

We claim:

1. A method of recovering metal from waste plating stream and using the recovered metal comprising:

providing a metal plating system comprising a soluble anode that provides nickel ions to a plating solution and a cathode that provides a substrate to be deposited with the nickel ions;

providing an aqueous rinse bath for washing the substrate after deposition of some of the nickel ions on the substrate;

providing a waste metal plating stream from the aqueous rinse bath containing an aqueous solution that includes nickel ions that did not deposit onto the substrate;

passing the waste metal plating stream into an electrochemical cell assembly having an inlet for the waste metal plating stream, a plurality of alternating anodes and cathodes porous to the waste metal plating stream, a plurality of ceramic diaphragms that separate the anodes and cathodes, and an exit from the electrochemical cell assembly, wherein the cathodes are formed from sintered powder nickel;

passing the waste metal plating stream through pores of the cathodes;

passing an electrical current through the anodes and cathodes of the electrochemical cell assembly, thereby depositing a portion of the nickel ions in the waste metal plating stream onto the cathodes and reducing the amount of the nickel ions in the waste metal plating stream;

recycling the waste metal plating stream exiting the electrochemical cell assembly back to the aqueous rinse bath, and using the deposited nickel on one of the cathodes and the cathode as the soluble anode in the metal plating system to provide a source of the nickel ions to be deposited in a subsequent metal plating process.

2. The process of claim 1 wherein the cathodes are comprised of sintered powder nickel having a porosity of 5 to 100 pores/inch (PPI).

3. The process of claim 1 wherein the waste plating stream has a nickel ion content of at least 200 g/liter.

4. The process of claim 1 wherein the waste metal plating stream is subjected to metal deposition and upon exiting the electrochemical cell assembly has a nickel ion content as low as 50 g/liter.

5. The process of claim 1 wherein the deposited nickel on the cathodes of the electrochemical cell assembly is fractured into pieces and is used as a source of the nickel ions to be deposited in the subsequent metal plating process.

6. The method of claim 5, further comprising:
cutting the fractured pieces of the deposited nickel into smaller pieces prior to utilizing the fractured pieces as the source of nickel ions in the metal plating system.

7. A process comprising:
providing a metal plating system comprising a soluble anode that provides metal ions to a plating solution and a cathode that provides a substrate to be deposited with the metal ions;
providing an aqueous rinse bath for washing the substrate after deposition of some of the metal ions on the substrate;
providing a waste metal plating stream from the aqueous rinse bath containing metal ions that did not deposit onto the substrate;
passing the waste metal plating stream into an electrochemical cell assembly having an inlet for the waste metal plating stream, a plurality of alternating anodes and metallic cathodes porous to the waste metal plating stream, a plurality of ceramic diaphragms that separate the anodes and cathodes, and an exit from the electrochemical cell assembly;
passing said waste metal plating stream through pores of at least one of the plurality of metallic cathodes;
passing an electrical current through the plurality of alternating anodes and metallic cathodes, thereby depositing a portion of the metal ions onto at least one of the plurality of metallic cathodes and reducing the amount of the metal ions in the waste metal plating stream;
removing the at least one of the plurality of metallic cathodes from the electrochemical cell assembly;
recovering the portion of the metal ions deposited on the at least one of the plurality of metallic cathodes by fracturing the deposited portion into pieces to provide fractured recovered portions and removing the fractured recovered portions from the at least one of the plurality of metallic cathodes;
using the fractured recovered portions in the metal plating system as a source of the metal ions to be deposited in a subsequent metal plating process; and
reintroducing the at least one of the plurality of metallic cathodes without the recovered portion of the metal ions to the electrochemical cell assembly to continue removing metal ions from the waste metal plating stream.

8. The method of claim 7, further comprising:
cutting the fractured pieces of the deposited metal into smaller pieces prior to utilizing the fractured pieces as a source of the metal ions in the metal plating system.

9. The process of claim 7 wherein the metal ions contained in the waste metal plating stream comprise one of cadmium, cobalt, copper, lead, nickel, zinc, chromium, or precious metal ions or mixtures thereof.

10. The process of claim 7 wherein the metal ions contained in the waste metal plating stream are nickel metal ions.

11. The process of claim 7 wherein the metal ions contained in the waste metal plating stream are copper metal ions.

* * * * *

UNITED STATES PATENT AND TRADEMARK OFFICE
CERTIFICATE OF CORRECTION

| | | |
|---|---|---|
| PATENT NO. | : 7,794,582 B1 | Page 1 of 1 |
| APPLICATION NO. | : 10/817655 | |
| DATED | : September 14, 2010 | |
| INVENTOR(S) | : Paul E. Cook and Jeries I. Bishara | |

It is certified that error appears in the above-identified patent and that said Letters Patent is hereby corrected as shown below:

Column 2 Line 19; "as an" should be changed to -- as a --.

Column 2 Line 55; "Ph" should be changed to -- pH --.

Column 2 Line 62; "moves" should be changed to -- moved --.

Column 4 Line 37; "Circuit Beakers" should be changed to -- Circuit Breakers --.

Column 5 Line 28, 29; "approximate" should be changed to -- approximately --.

Signed and Sealed this
Thirty-first Day of May, 2011

David J. Kappos
*Director of the United States Patent and Trademark Office*